United States Patent [19]

Clegg

[11] Patent Number: 4,603,686
[45] Date of Patent: Aug. 5, 1986

[54] WALL-MOUNTED CONICAL BEAM CONCENTRATOR

[76] Inventor: John E. Clegg, 2320 Keystone Dr., Orlando, Fla. 32806

[21] Appl. No.: 770,126

[22] Filed: Aug. 28, 1985

[51] Int. Cl.⁴ .............................................. F24J 3/02
[52] U.S. Cl. ..................................... 126/440; 428/438
[58] Field of Search ................. 126/439, 440; 350/264

[56] References Cited

U.S. PATENT DOCUMENTS

| | | | |
|---|---|---|---|
| 285,625 | 9/1883 | Hyatt | 350/264 |
| 583,580 | 6/1897 | Pennycoidz | 126/440 |
| 2,881,654 | 4/1959 | Toffolo | 350/432 |
| 2,882,784 | 4/1959 | Toffolo | 350/432 |
| 4,277,148 | 7/1981 | Clegg | 350/432 |
| 4,325,612 | 4/1982 | Clegg | 126/438 |
| 4,329,021 | 5/1982 | Bennett et al. | 350/259 |
| 4,333,713 | 6/1982 | Clegg | 350/432 |

FOREIGN PATENT DOCUMENTS

| | | | |
|---|---|---|---|
| 5285 | 3/1901 | Austria | 350/264 |
| 129821 | 1/1985 | European Pat. Off. | 350/264 |

*Primary Examiner*—Samuel Scott
*Assistant Examiner*—Carl D. Price

[57] ABSTRACT

A conical beam concentrator mounted on the exterior concrete-block wall of a circular building so as to receive diffused sunlight and emit a concentrated convergent lateral beam in the horizontal plane; a curved glass block mounted in the wall so as to transmit the convergent lateral beam through the wall into the crawl space beneath the building; and a circular conical beam concentrator mounted in the crawl space in the center of the building so as to receive the convergent lateral beam, refract the beam twice more and emit a concentrated convergent lateral beam onto a vertical metal heating element which absorbs the heat of the beam and radiates the heat into the crawl space of the building.

1 Claim, 7 Drawing Figures

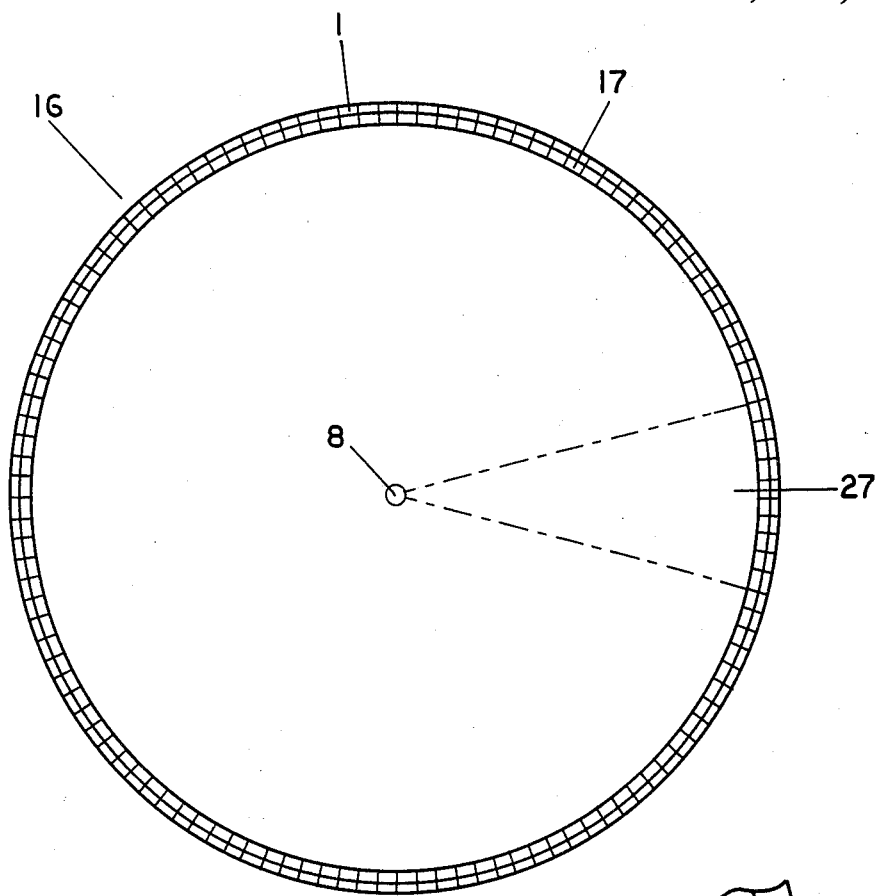
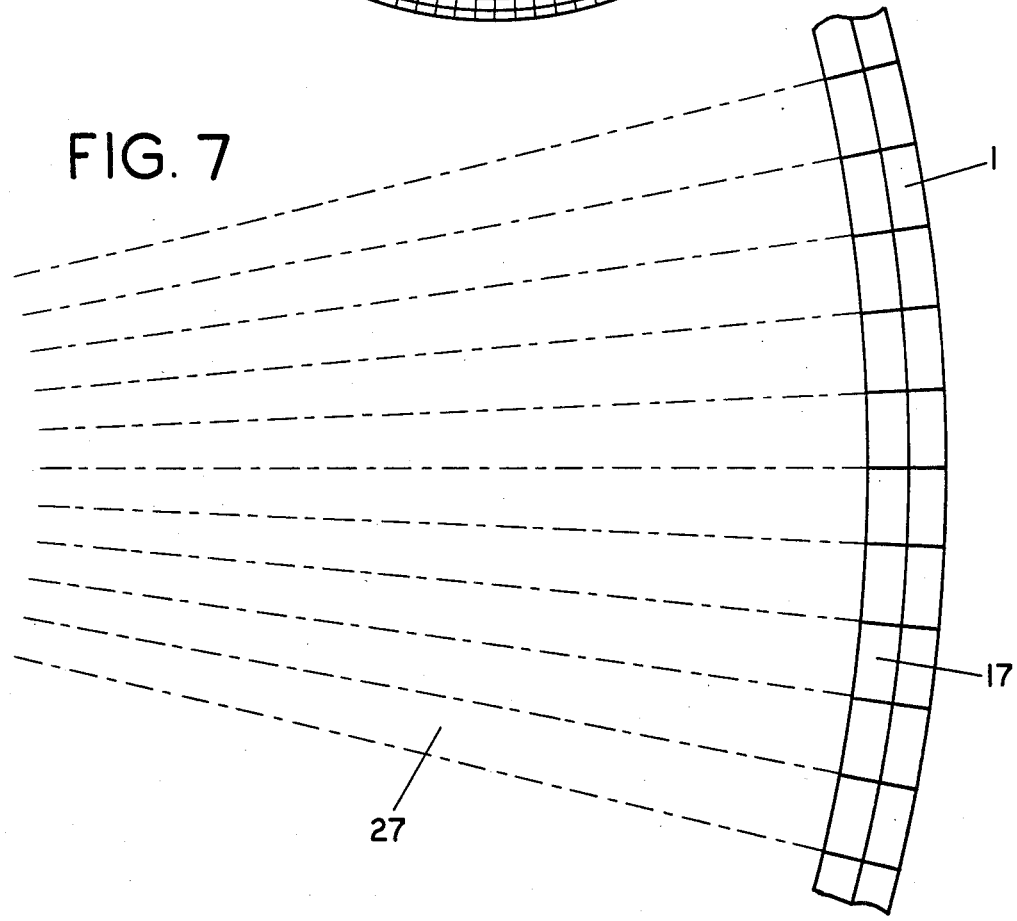

4,603,686

WALL-MOUNTED CONICAL BEAM CONCENTRATOR

BACKGROUND

The code designation of the beam concentrator is 2RT-2T-LRT:C (R—refracting section of a component lens, T—transmitting section of a component lens, L—reflecting section of a component lens, and C—concentrating stage lens). 2RT refers to the circular conical beam concentrator mounted in the crawl space in the center of the building, 2T refers to the glass block forming the base course of the wall, LRT refers to the conical beam concentrator mounted to the wall, and C refers to the lenses' function.

Prior art includes three conical beam concentrators which receive annular incipient beams and emit concentrated circular whole beams (U.S. Pat. Nos. 2,881,654 and 2,882,784 by Toffolo; and U.S. Pat. No. 4,325,612 by Clegg) and four conical beam concentrators which receive whole incipient beams and emit concentrated circular whole beams (U.S. Pat. Nos. 4,277,148; 4,333,713; 4,492,438; and 4,521,085 by Clegg). None of these concentrators can receive diffused sunlight and emit concentrated convergent lateral beams in the horizontal plane, this being the distinctive patentable feature of the disclosure.

Concurrent art includes three conical beam concentrators which do receive diffused sunlight; *Conical Beam Concentrator* RT:C, U.S. Pat. No. 4,575,196, dated Mar. 11, 1986; *Conical Beam Concentrator* RT:C, Ser. No. 651,015, filed Sept. 17, 1984; and *Conical Beam Concentrator* RT:C, Ser. No. 641,274, filed Aug. 16, 1984. These concentrators emit concentrated circular whole beams parallel to the vertical optic axis.

The subject disclosure is similar to the three above concentrators in that it too receives diffused sunlight; it differs in that it emits a concentrated convergent lateral beam in the horizontal plane.

The circular conical beam concentrator mounted in the crawl space in the center of the building is identical to the concentrator filed earlier in a copending application; *Circular Conical Beam Concentrator* 2RT:C, Ser. No. 654,297, filed Sept. 25, 1984.

DRAWINGS

FIG. 6 is a plan view of the conical beam concentrator mounted to the concrete-block wall of the circular building.

FIG. 7 is an enlarged view of a section of the conical beam concentrator and concrete-block wall with a ray diagram of the convergent lateral beam.

DESCRIPTION

Figure 1:
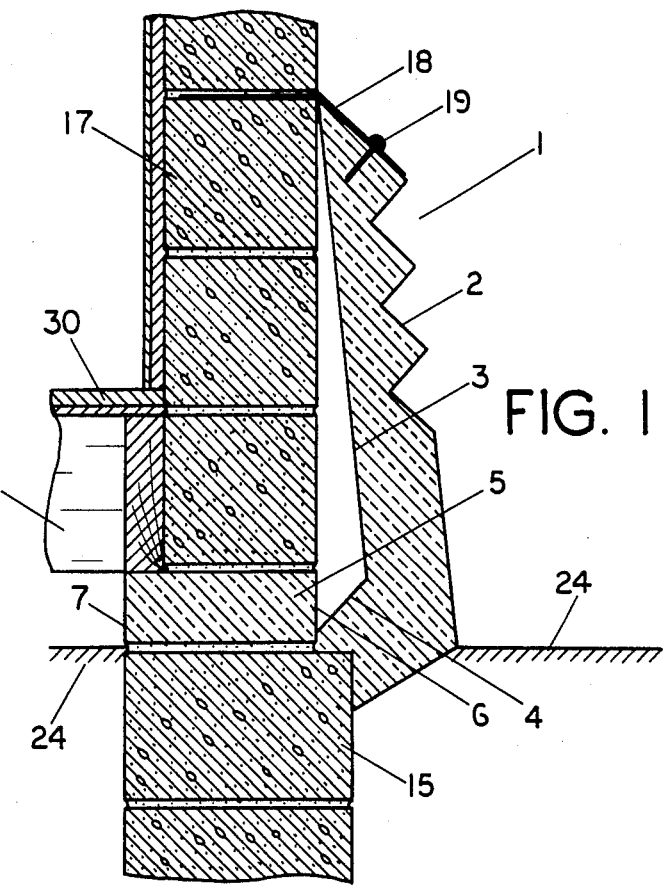
FIG. 1 is an elevation of the wall-mounted conical beam concentrator with the lens shown in section.
Figure 2:
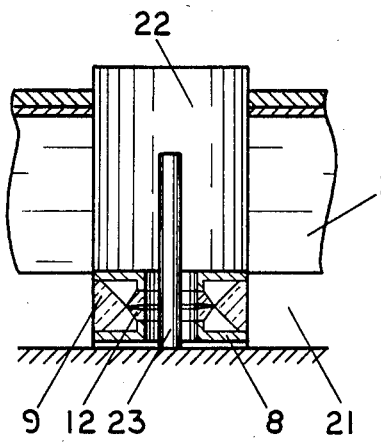
FIG. 2 is an elevation of the circular conical beam concentrator with the lenses shown in section.

FIGS. 1 and 2 are elevations of the wall-mounted conical beam concentrator comprising annular frusto-conical beam concentrator 1 having four inset convex conical sections 2, a concave conical section 3 and a concave conical reflective section 4; comprising curved glass block 5 having concentric outer cylindrical section 6 and inner cylindrical section 7; and comprising circular conical beam concentrator 8 (FIG. 5) having an outer annular component lens 9 with a cylindrical section 10 and two opposed concave conical sections 11, and having an inner annular component lens 12 with two opposed convex conical sections 13 and two opposed concave conical sections 14.

Concentrator 1 is seated at its base on the upper surface of curved concrete block 15 of the foundation wall of circular building 16 (FIG. 6) and secured to concrete block wall 17 by steel strap 18 and pin 19 (FIG. 1).

Curved glass block 5 is the first course of concrete block wall 17 and is the base on which floor joists 20 rest.

Concentrator 8 is located in crawl space 21 at the center of circular building 16 (FIG. 6). The concentrator is mounted inside hollow cylinder 22 through which the concentrator can be raised and lowered. Heating element 23 is a vertical metal rod mounted inside concentrator 8.

The term crawl space as used herein refers to the air space of four inches between grade 24 and floor joists 20. The purpose of the air space is to provide an open unobstructed passageway for the convergent lateral beam from the periphery of the building to the center. Access of workmen below the building is provided by trenches.

FIG. 6 is a plan view of concentrator 1 mounted to the concrete-block wall 17 of circular building 16. The diameter of building 16 is fifteen and a half meters (fifty one feet). Concentrator 1 consists of an annular lens divided into one hundred and twenty curved sections, each section being mounted to the outside face of a block of wall 17, and consists of an equal number of curved glass blocks 5 laid below wall 17.

Figure 5:
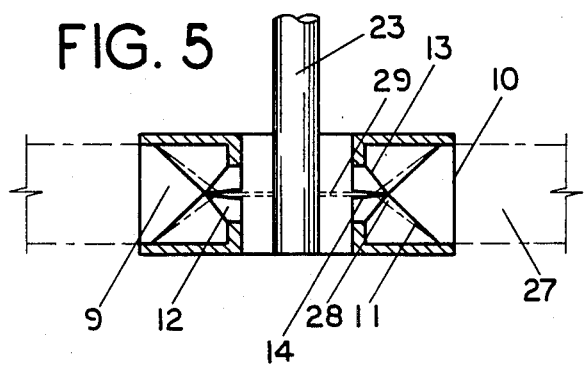
FIG. 5 is an enlarged view of the circular conical beam concentrator with a ray diagram.
Figure 4:
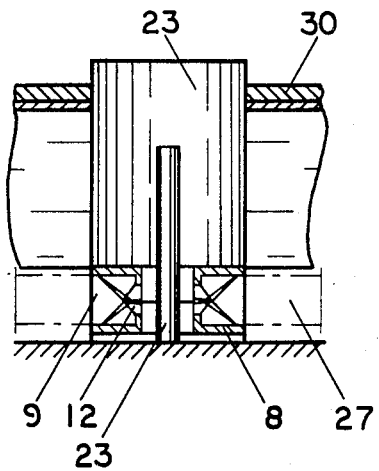
FIG. 4 is an elevation of the circular conical beam concentrator with a ray diagram.
Figure 3:
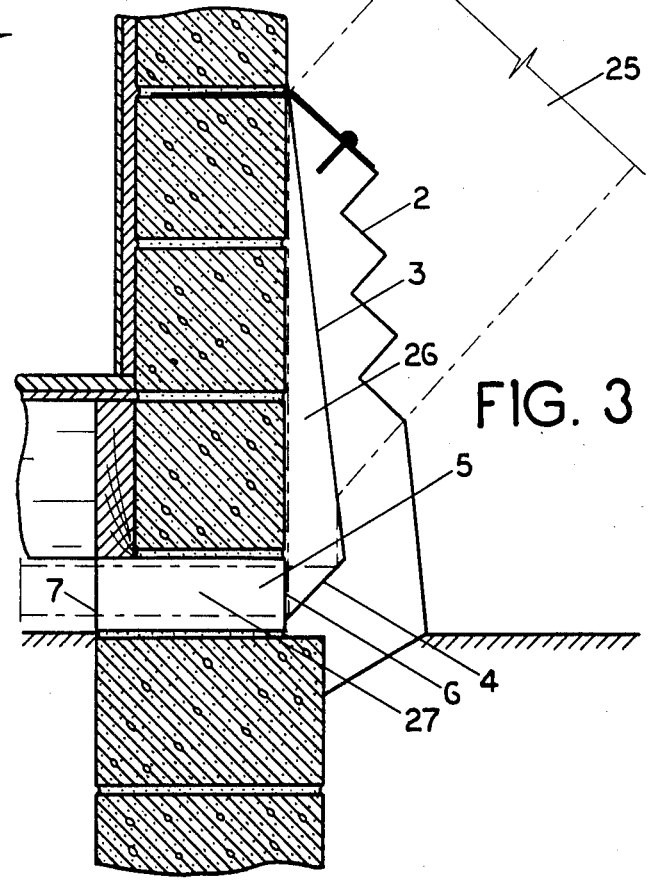
FIG. 3 is an elevation of the wall-mounted conical beam concentrator with a ray diagram.

FIGS. 3, 4 and 5 are elevations of the concentrators with ray diagrams. Diffused sunlight 25 is received and transmitted by inset convex conical sections 2 and refracted and emitted by concave conical section 3, forming concentrated vertical annular beam 26.

Beam 26 is reflected by concave conical reflective section 4, forming concentrated convergent lateral beam 27 which is projected inward through cylindrical sections 6 and 7 of curved glass block 5 to concentrator 2RT 8 in the center of the building.

Beam 27 is received and transmitted by cylindrical section 10 and refracted and emitted by two opposed concave conical sections 11, forming two concentrated convergent conical beams 28.

Beams 28 are transmitted by two opposed convex conical sections 13 and refracted and emitted by two opposed concave conical sections 14, forming concentrated convergent lateral beam 29 which strikes heating element 23.

Heating element 23 absorbs the heat of beam 29 and radiates that heat into the crawl space 21 beneath floor 30 of the building. Special provisions are required to assure an even distribution of heat throughout the entire floor area. The floor joists must not form barriers to the flow of heat.

The heat content of diffused sunlight is low, so the area of diffused sunlight must be large enough to produce a concentrated beam with an intensity high enough to provide sustained heat to the heating element throughout the daylight hours. The beams must be reduced in size not only by refraction but by convergence as well, as shown in the table below:

| Beam | Incident bm. area - cm² | Means of reduction | Reduced bm. area - cm² |
|---|---|---|---|
| Diffused sunlight 25 | 198,000 | Refraction | 30,700 |
| Conv. lat. bm. 27 | 30,700 | Convergence | 400 |
| Conv. lat. bm. 27 | 400 | Refraction | 34 |
| Conv. con. bms. 28 | 34 | Refraction | 1.2 |

The reduced beam area 1.2 cm² is the area of concentrated convergent lateral beam 29 at the point of contact with heating element 23.

I claim:

1. A wall-mounted conical beam concentrator comprising in general an annular frusto-conical beam concentrator mounted to a concrete-block wall of a circular building, a course of curved glass blocks forming a base of the concrete-block wall, and a circular conical beam concentrator located in a crawl space located below a floor of the circular building; said annular frusto-conical beam concentrator, said curved glass blocks and said circular conical beam concentrator comprising the means by which diffused sunlight is reduced in size to a small concentrated beam which delivers heat to a central heating element located at the center of the circular building as means of heating the crawl space and said floor of the circular building; and comprising in particular;

an annular frusto-conical beam concentrator having four inset convex conical sections which receive diffused sunlight, said annular frusto-conical beam concentrator having a concave conical section which refracts and emits said diffused sunlight to form a concentrated vertical annular beam, said annular frusto-conical beam concentrator further having a concave conical reflective section which reflects said concentrated vertical annular beam to form a concentrated convergent lateral beam which is projected toward the center of the circular building;

a series of curved glass blocks forming the base course of said concrete-block wall, said curved glass blocks having a concentric outer cylindrical section and an inner cylindrical section which transmit said concentrated convergent lateral beam through said crawl space toward the center of the circular building;

a circular conical beam concentrator having an outer annular component lens and an inner annular component lens; said outer annular component lens having a cylindrical section which receives and transmits said concentrated convergent lateral beam, said outer annular component lens having two opposed concave conical sections which refract and emit said concentrated convergent lateral beam to form two concentrated convergent conical beams; said inner annular component lens having two opposed convex conical sections which receive and transmit said two concentrated convergent conical beams, said inner annular component lens having two opposed concave conical sections which refract and emit said two concentrated convergent conical beams to form a second concentrated convergent lateral beam; and a heating element comprising a vertical metal rod mounted inside said inner annular component lens so as to intercept said second concentrated convergent lateral beam and absorb the heat thereof as means of heating said crawl space and said floor of the circular building.

* * * * *